US009689203B1

(12) United States Patent
Freberg et al.

(10) Patent No.: US 9,689,203 B1
(45) Date of Patent: Jun. 27, 2017

(54) BARRIER OPENING SYSTEM FOR EMERGENCY ESCAPE AND RESCUE

(71) Applicant: Lawrence Roll-Up Doors, Inc., Baldwin Park, CA (US)

(72) Inventors: Paul Freberg, Baldwin Park, CA (US); Paul Lawrence, Baldwin Park, CA (US); Steve Hahn, Baldwin Park, CA (US)

(73) Assignee: Lawrence Roll-Up Doors, Inc., Baldwin Park, CA (US)

( * ) Notice: Subject to any disclaimer, the term of this patent is extended or adjusted under 35 U.S.C. 154(b) by 55 days.

(21) Appl. No.: 14/965,058

(22) Filed: Dec. 10, 2015

(51) Int. Cl.
*F16D 65/28* (2006.01)
*E06B 9/82* (2006.01)
*E06B 9/68* (2006.01)

(52) U.S. Cl.
CPC .................. *E06B 9/82* (2013.01); *E06B 9/68* (2013.01); *E06B 2009/6818* (2013.01)

(58) Field of Classification Search
CPC ..... E06B 5/16; E06B 9/56; E06B 9/74; E06B 9/68; E06B 9/82; E06B 2009/6818; E05F 15/668; E05F 15/70; E05F 15/72
See application file for complete search history.

(56) References Cited

U.S. PATENT DOCUMENTS 4,365,250 A * 12/1982 Matsuoka ............. E05F 15/668 318/16
5,542,460 A 8/1996 McKeon ........................... 160/7
5,896,907 A * 4/1999 Dever .................... A62C 2/241 160/6
6,484,784 B1 * 11/2002 Weik, III ................ E05F 1/006 160/7
6,737,823 B2 * 5/2004 Reed ......................... E06B 9/68 318/280
7,138,912 B2 * 11/2006 Fitzgibbon .............. E05F 15/72 160/7
7,448,426 B2 11/2008 Hsieh ................................ 160/7
7,537,038 B2 5/2009 Hsieh ................................ 160/9
7,574,826 B2 * 8/2009 Evans ..................... E05F 15/72 49/13
7,610,719 B2 11/2009 Hsieh .............................. 49/322
(Continued)

*Primary Examiner* — Katherine Mitchell
*Assistant Examiner* — Abe Massad
(74) *Attorney, Agent, or Firm* — Bui Garcia-Zamor; Jessica H. Bui, Esq.

(57) ABSTRACT

A barrier opening system for emergency escape and rescue comprises a vertical acting barrier device, an escape device, and a rescue device, the vertical acting barrier device winds a barrier via a winding shaft; a prestressed spring preloaded on the winding shaft for storing a restoring force when the barrier is unwound by the winding shaft; a brake mechanism for stopping the winding shaft from rotating; a brake release mechanism for releasing the winding shaft under an abnormal condition; an escape device comprising an identification unit and a master key for activating the brake release mechanism; the identification unit identifies a rescue personnel's identity before allowing the personnel to use the master key to activate the brake release mechanism; when the emergency button and/or the master key activate(s) the brake release mechanism to release the winding shaft, the barrier can be lifted up by the restoring force.

11 Claims, 7 Drawing Sheets

(56) References Cited

U.S. PATENT DOCUMENTS

| | | | | |
|---|---|---|---|---|
| 7,699,144 | B2 * | 4/2010 | Hsieh | E05F 1/006 160/9 |
| 8,567,573 | B2 | 10/2013 | Hsieh | 188/156 |
| 9,416,579 | B2 * | 8/2016 | Rejc | E06B 9/84 |
| 9,525,308 | B1 * | 12/2016 | Bullock | H02J 9/061 |

* cited by examiner

BARRIER OPENING SYSTEM FOR EMERGENCY ESCAPE AND RESCUE

BACKGROUND OF THE INVENTION

Field of the Invention

The present invention relates to a barrier opening system for emergency escape and rescue, through which a barrier can be opened immediately by a prestress/restoring force in the shortest possible time without having to break through the barrier in case of emergency.

Description of the Related Art

For access control barriers such as fire-proof barriers, smoke-proof barriers, and emergency exits, a vertical acting barrier is widely used. Current Building/Fire Law has strict regulations for the exits and entrances of a public space where many people gather, especially for stores and multi-family residence that have no escape barrier but only one exit and entrance, and for the safety standards of compartment barriers and/or emergency exits. In case of emergency or imminent danger, a vertical acting barrier must be opened as quickly as possible, even without electricity and external assistances, to prevent the barrier from seizing shut, trapping people, vehicles, or property inside.

With regard to a conventional vertical acting barrier, a brake mechanism maintains in a brake state when an electric motor does not rotate in normal time, and a barrier bolt device is used to lock the vertical acting barrier at lower dead point when the vertical acting barrier reaches the lower dead point. By this vertical acting barrier, in case of emergency, for example, a fire breaks out, an earthquake occurs, or a flood hits, the barrier bolt must be released before a switch can be activated to open the vertical acting barrier. If there is no power supply, a manual mode must be taken, in which a brake release lever has to be actuated to release the brake, and a pull chain has to be pulled to rotate a pull-chain disc in order to open the barrier.

The above-mentioned vertical acting barrier cannot be opened by intuitive response. In case of emergency, to open the vertical acting barrier, one has to learn the way to operate beforehand, and must be strong enough to operate. Such manual mode operation would be difficult to the elderly, disabled, pregnant women, and children, and would cause a delay in evacuation. Furthermore, from the rescue aspect, police officers/firefighters can not enter the building without a key for such conventional vertically acting barrier if an emergency occurs indoors, and they have to break through the vertical acting barrier by force. Not only is the property damaged, but also a delay in rescue results.

Presently, a new rescue concept is provided. For example, a master key can be used to enter commercial and residential buildings. In North America, it is common practice for building owners to provide the police officers/firefighters with a Knox access. The Knox access is mainly a master key, which can open the automatic barriers or lock gates of all buildings directly or can open a storage box in which a key set is kept. As such, police officers/firefighters can have access to a master key from the storage box, and enter the building for fire rescue without having to break through the barrier, which will cause damage to the property, and result in a fire rescue delay.

U.S. Pat. No. 7,537,038 issued to the present inventor proposes a "Release Control Mechanism for Emergency Exit" with the intention to reduce the time and simplify the steps for opening the barrier. Some examples of applications relating to known vertical acting barriers are provided in, for example, U.S. Pat. No. 5,542,460, U.S. Pat. No. 7,448,426, and U.S. Pat. No. 7,610,719.

SUMMARY OF THE INVENTION

In view of the problems and disadvantages of the prior art, the main object of the present invention is to provide a barrier opening system for emergency escape and rescue, wherein in case of emergency or imminent danger, a barrier can be still opened by those trapped indoors in the shortest possible time for safe escape even without power supply and external assistances.

Another object of the present invention is to provide a barrier opening system for emergency escape, rescue, and vehicle relocation, wherein in case of emergency or imminent danger, rescue personnel can open a barrier for rescue in the shortest possible time without having to break through the barrier.

To achieve the above and other objects, a barrier opening system for emergency escape and rescue according to the present invention mainly comprises: a vertical acting barrier device, winding a barrier to open or unwinding the barrier to close via a winding shaft; and a prestressed spring, preloaded on the winding shaft for accumulating a restoring force when the barrier is unwound using the winding shaft.

The barrier opening system further comprises a barrier operator unit, including a central shaft, an electric motor, a brake mechanism, and a brake release mechanism. The electric motor is coupled with the central shaft so as to rotate the winding shaft. One end of the central shaft is fixedly connected with a brake disc. The brake mechanism comprises a sleeve, a clutch end disc, an elastic element, and an electromagnetic generator. The sleeve extends through the central shaft, and can slide axially, but can not rotate with respect to the central shaft. The clutch end disc faces the brake disc and is secured to one end of the sleeve. Another end of the sleeve is provided with a pair of limit rings. The elastic element is used to urge the clutch end disc against the brake disc, thereby braking the central shaft. The electromagnetic generator is used to retract the clutch end disc so as to separate the clutch end disc from the brake disc, thereby releasing the central shaft.

The brake release mechanism comprises a swing arm, an actuator, and a slide bar. The first end of the swing arm is disposed between the pair of limit rings, and the second end of the swing arm extends to the outside of the barrier operator unit and can swing between a holding position and a offset position so as to actuate the sleeve to slide axially at the offset position and to separate the clutch end disc from the brake disc. The actuator is disposed outside the barrier operator unit. The slide bar can slide between the swing arm and the actuator. The slide bar is biased by a spring to tend to slide toward the swing arm. When electrically excited, the actuator retracts the slide bar and makes the slide bar accumulate a spring potential energy. In case of power failure, the actuator releases the slide bar to impact the swing arm to swing toward the offset position, such that the brake can be released to make the winding shaft rotate freely.

The barrier opening system further comprises an escape device, including a barrier opening unit for activating the brake release mechanism to release the brake mechanism. The barrier opening system further comprises a rescue device, including an identification unit and a key security mechanism. The identification unit is used to input an identification data by the rescue personnel. The key security mechanism is used to store a master key. The master key can activate the brake release mechanism to release the brake mechanism. The emergency barrier opening system further comprises a backup power device, used to supply a backup power for the system to operate when there is a power failure.

The barrier opening system further comprises a main controller, electrically connected with the barrier operator unit, the escape device, the rescue device, and the backup power device. When the main controller controls the electric motor to rotate, the brake mechanism takes a brake release action, and when the controller controls the electric motor not to rotate, the brake mechanism takes a braking action. The main controller comprises a database unit and a data processing unit. The database unit stores the identification data. The data processing unit compares the identification data provided by the identification unit with those stored in the database unit, and activates the key security mechanism to allow the rescue personnel to take the master key if there is a match in identification data. When at least one of an emergency button or the master key activates the brake release mechanism to release the brake mechanism, the barrier is lifted up by the restoring force of the prestressed spring.

According to the barrier opening system of the present invention, the restoring force of the prestressed spring is greater than the weight of the barrier. When the emergency button or the master key activates a barrier bolt unit to release the barrier, the barrier can be lifted up by the restoring force of the prestressed spring. Preferably, the restoring force of the prestressed spring is preset to be capable of lifting up the barrier at least about 80 inches (203.2 cm).

Preferably, the vertical acting barrier device further comprises a barrier bolt device which may lock the barrier at a predetermined position by means of a bolt pin after the barrier is closed. The barrier bolt unit comprises a linear actuator for actuating the bolt pin to lock the barrier at the barrier closed position. For example, the linear actuator is a solenoid. When the solenoid is electrically excited, the bolt pin is maintained in a lock state. When the solenoid is not electrically excited, the bolt pin releases the barrier. Also, the barrier opening unit is electrically connected with the linear actuator. The emergency button activates the linear actuator to be able to release the bolt pin.

Preferably, the identification unit can be, for example, a card reading device, a keyboard, and an image capture device. The card reading device is a device used to read an identification chip (for example, RFID). The identification data comprises, for example, an authorization code, a user ID and its password, a user image, etc. Furthermore, the key security mechanism comprises a key box used to store the master key and a switch matching with the master key. The switch is electrically connected with the linear actuator. The master key can activates the linear actuator to release the bolt pin with the switch.

Preferably, the barrier opening system further comprises an access control management device electrically connected with the main controller. The access control management device includes an emergency detection unit and a monitoring unit. The emergency detection unit comprises a plurality of temperature sensors for detecting environmental temperatures, a plurality of smoke sensors for detecting environmental smoke concentrations, and a plurality of seismic sensors for detecting seismic waves. The monitoring unit comprises a plurality of surveillance cameras for capturing environmental images. The database unit of the main controller stores temperature security data, smoke concentration security data, seismic wave data, and background image data. The data processing unit of the main controller compares the environmental temperature detected by the temperature sensor, the environmental smoke concentration detected by the smoke sensor, the seismic wave data detected by the seismic sensors, and the environmental image captured by the surveillance camera with those data stored in the database unit via operation.

After the main controller further identifies the type of disaster, the disaster site, and the affected areas based on analysis presented by the data processing unit, it controls the brake release mechanism to release the brake mechanism and activates at least one of the escape device or the rescue device. After the identification data inputted to the identification unit by the user is compared and matches with the identification data stored in the database unit, the main controller activates the key security mechanism to allow the user to take the master key. When at lease one of the emergency button and the master key activates the barrier bolt unit to release the barrier, the barrier is lifted up by the restoring force of the prestressed spring.

Preferably, the access control management device further comprises an alarm and notification unit. When the main controller confirms the occurrence of a disaster, a real-time alarm is emitted in an acousto-optic way, and an escape route is shown in an acousto-optic way.

Accordingly, when an emergency or an imminent danger, for example, a fire, an earthquake, or a flood occurs, even though there is no electricity supplied, with a backup power, the main controller can obtain the user identification data via the card reading device, the keyboard or the image capture device of the identification unit, compares it with the identification data of the database unit through the operation of the data processing unit, and authorizes the user to open the key box of the key security mechanism once the main controller confirms the user's identity is a police officer or firefighter or another authorized person. Then, the user can take the master key from the key box and activate the switch with this master key to release the bolt pin so as to lift up the barrier. Therefore, the police officers/firefighters can enter the building for rescue without breaking through the barrier, causing a property damage, and affecting rescue time. Moreover, with regard to the emergency barrier opening system, people trapped indoors can still open the barrier fast by pressing the emergency button in the shortest time for safe escape even without electricity and external assistances.

Figure 3:
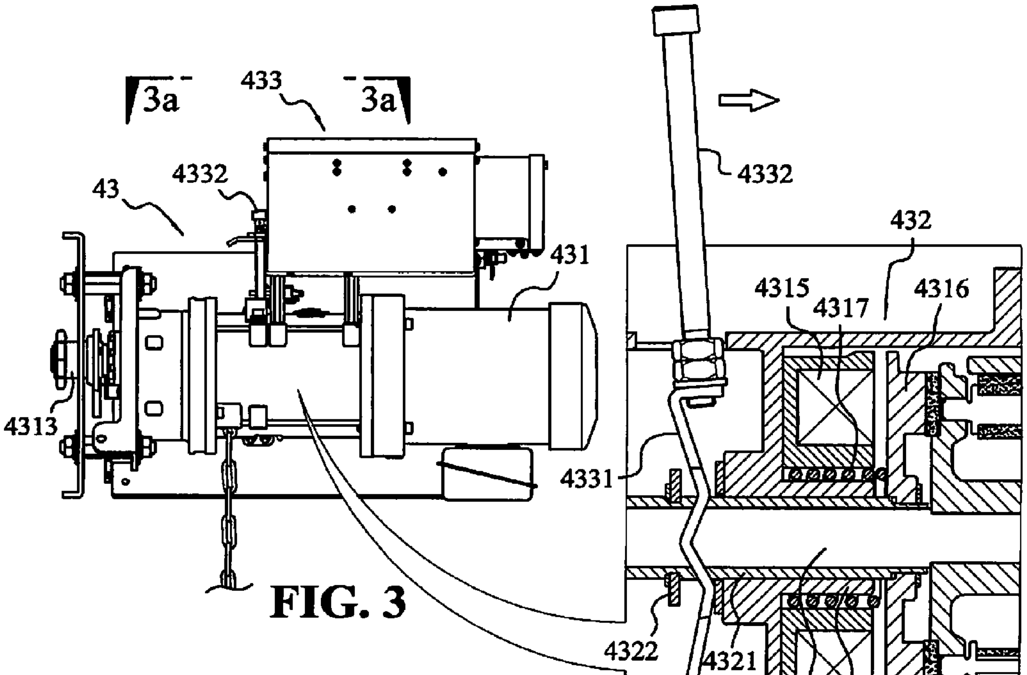
FIG. 3 is a schematic view showing a barrier operator unit of the present invention, wherein a brake mechanism is shown in a brake state in a partial enlarged cross-sectional view.
Figure 4:
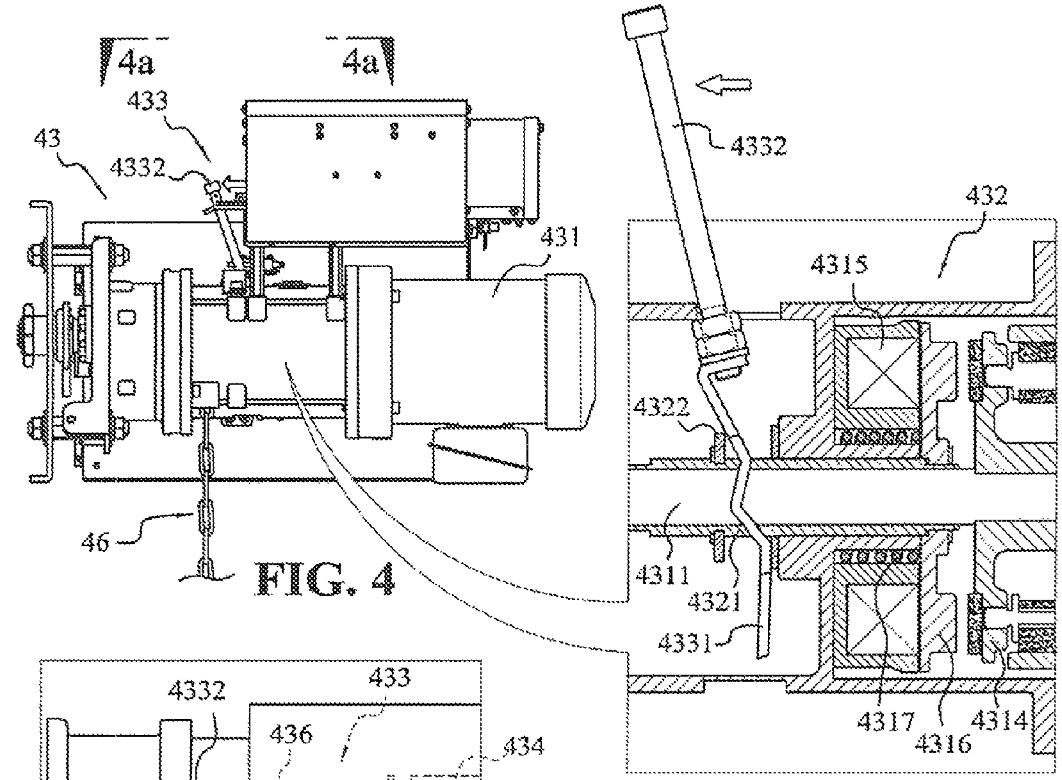
Figure 4A:
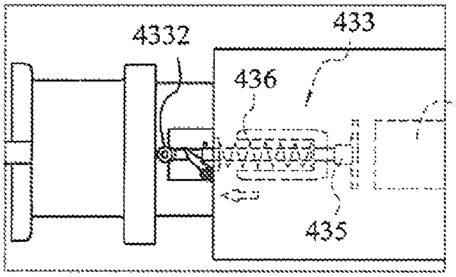
Figure 5:
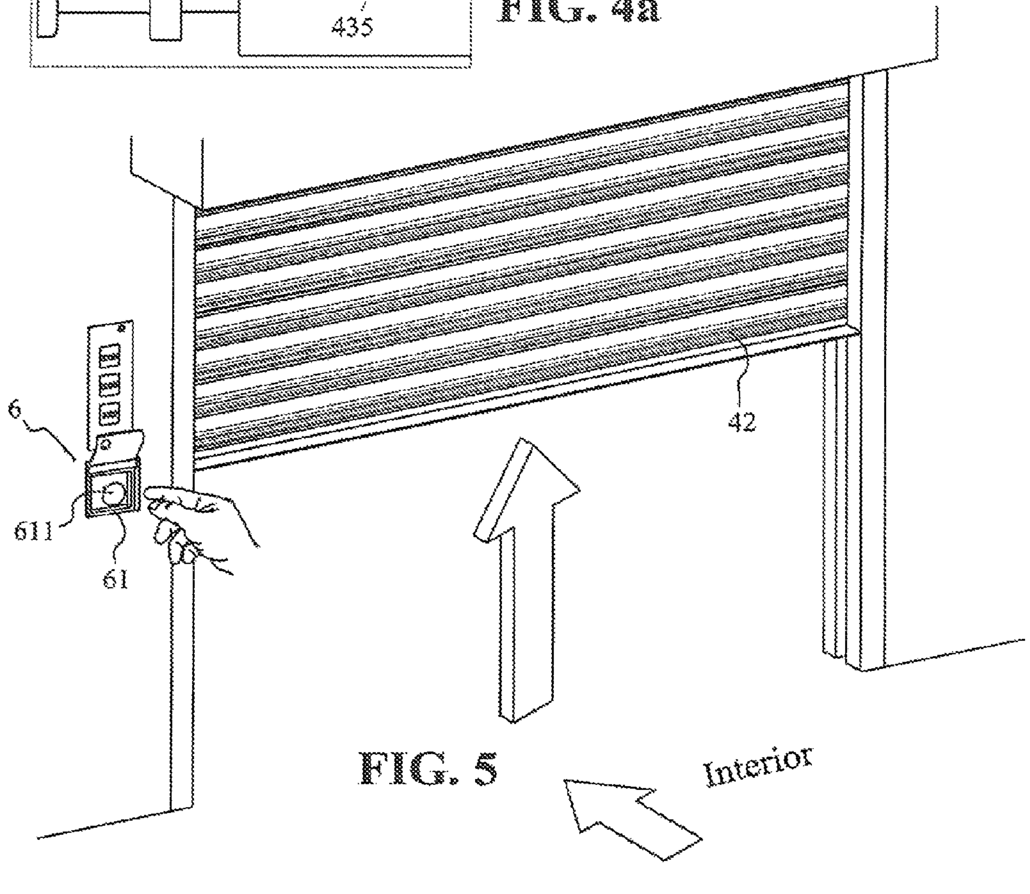
Figure 6:
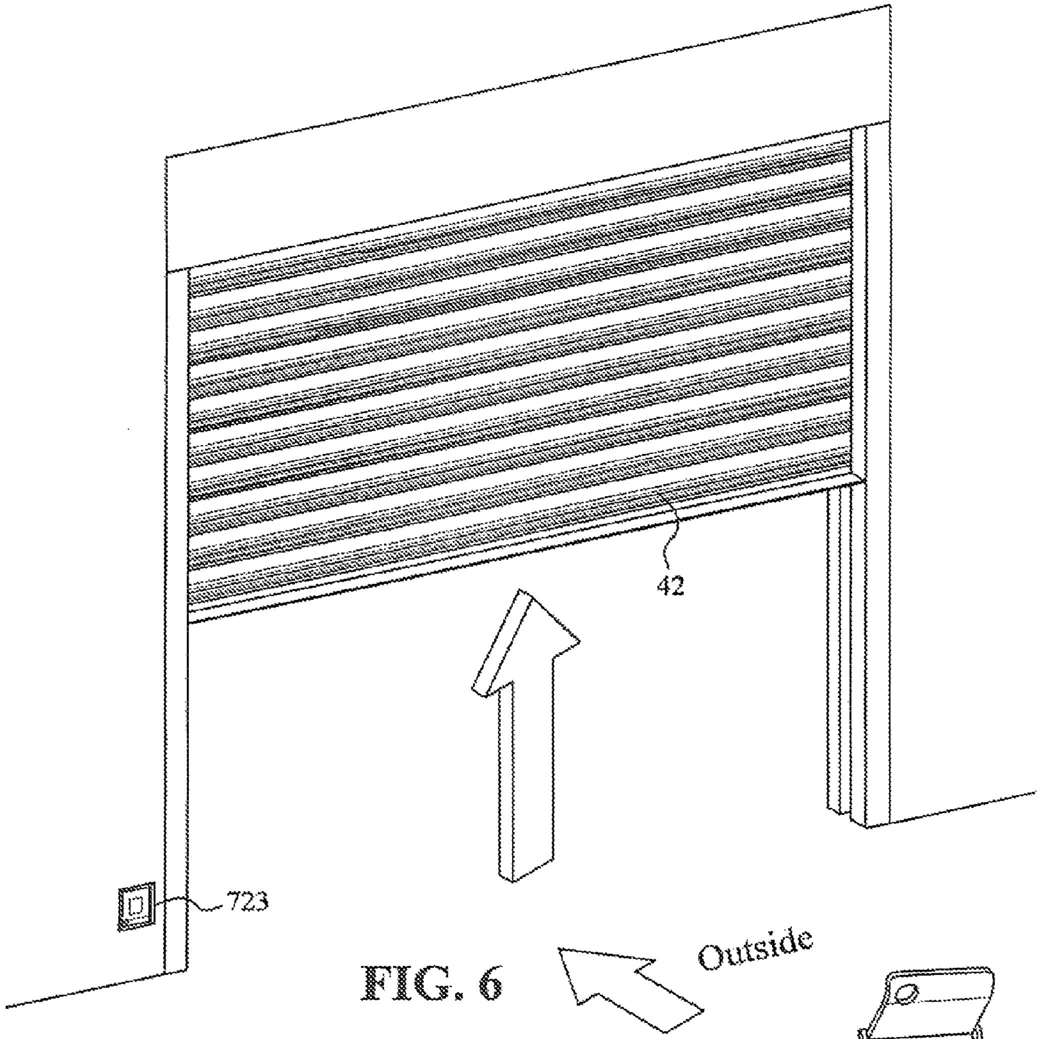
Figure 7B:
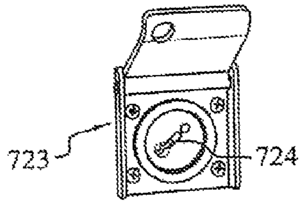
Figure 7:
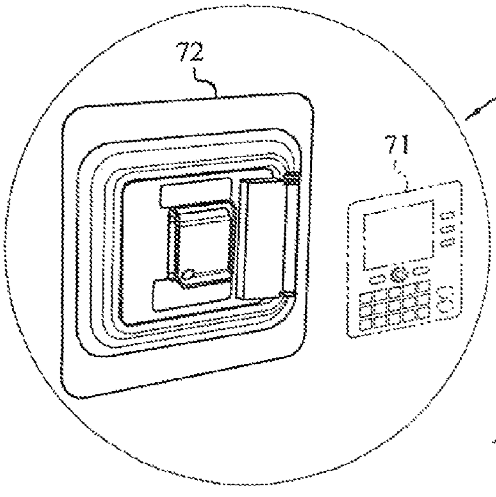
Figure 7A:
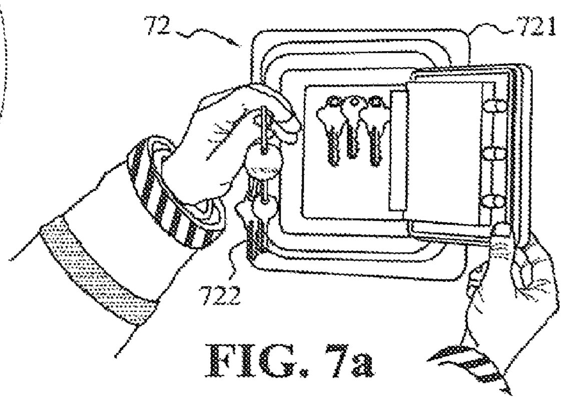

FIG. **3*a* is a partial enlarged view taken along line 3*a*-3*a* of FIG. 3**;

FIG. 4 is a schematic view showing the barrier operator unit of FIG. 3, wherein a brake release mechanism is shown to activate the brake mechanism to release the brake in a partial enlarged cross-sectional view;

FIG. 4*a* is a partial enlarged view taken along line 4*a*-4*a* of FIG. 4;

FIG. 5 is a schematic view showing an escape-barrier open state of the emergency barrier opening system of the present invention;

FIG. 6 is a schematic view showing a rescue-barrier open state of the emergency barrier opening system of the present invention;

FIG. 7 is a schematic view showing a key security mechanism of the present invention;

FIG. 7*a* is a schematic view showing that the key security mechanism of FIG. 7 is authorized to open a key box, so a master key can be taken;

FIG. 7*b* is a schematic view showing a keyhole matching with the master key of FIG. 7*a;*

Figure 8:
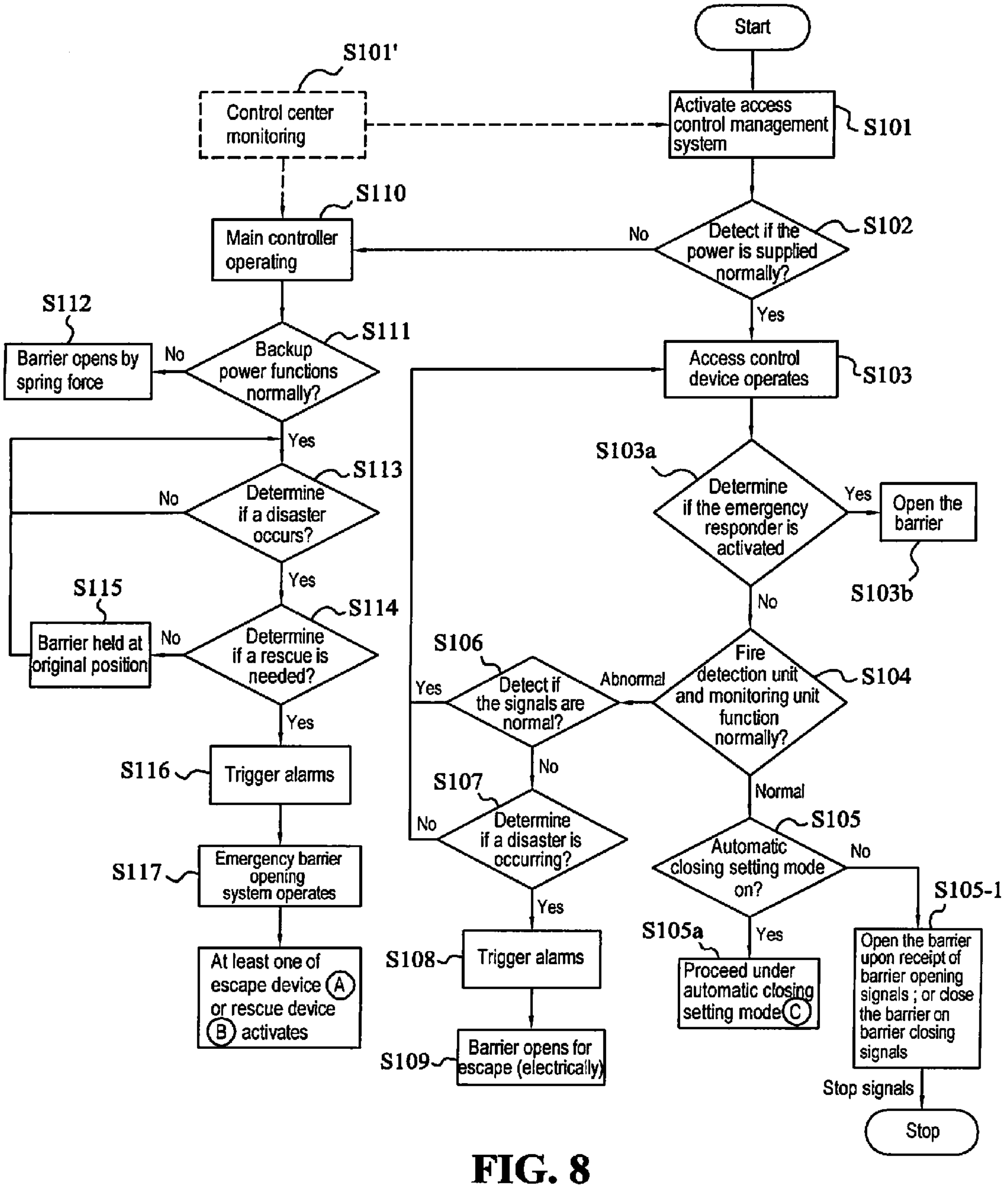
Figure 8A:
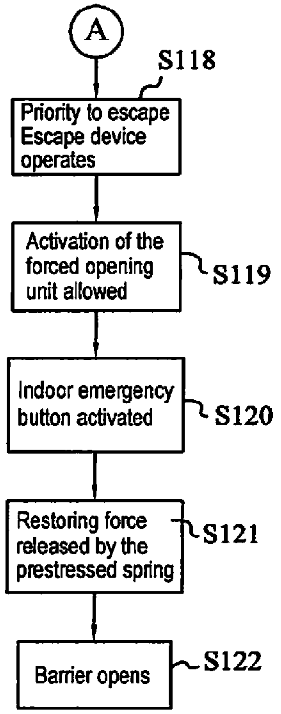
Figure 8B:
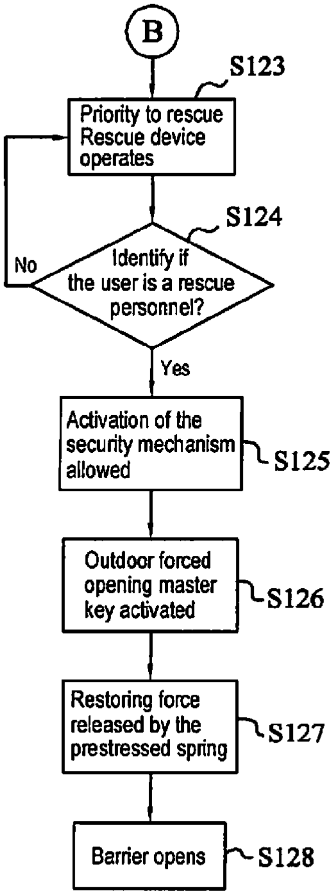
Figure 8C:
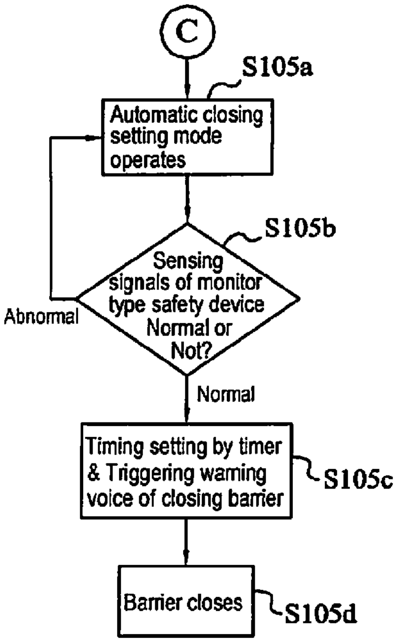
Figure 9:
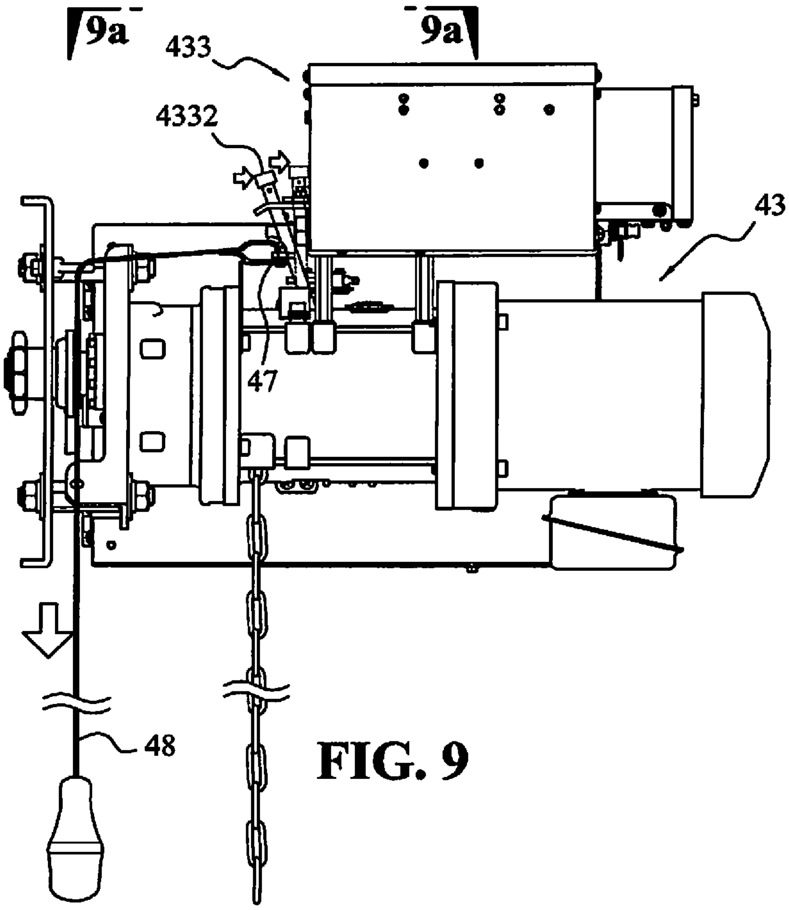
Figure 9A:
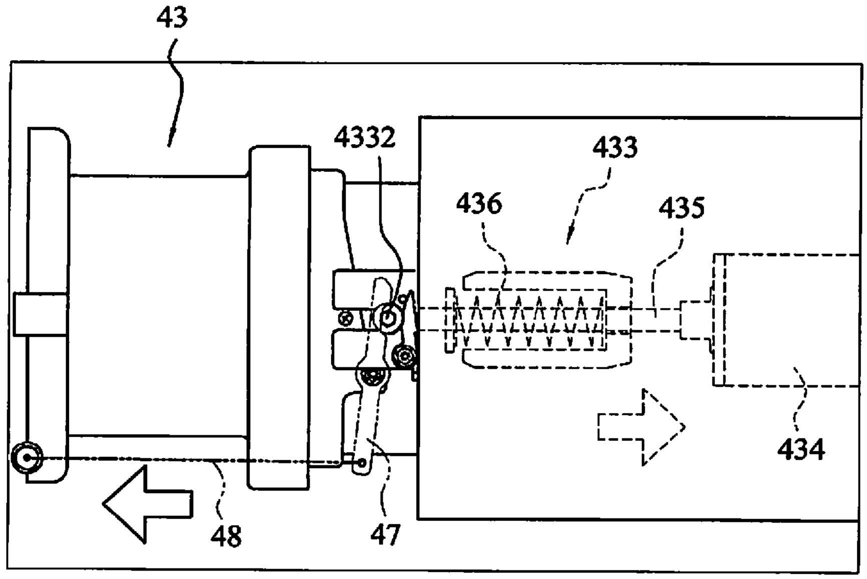

FIG. 8 is a work flow chart of the emergency barrier opening system according to the present invention;

FIG. 8*a* follows FIG. 8, and illustrates a work flow chart of the escape device;

FIG. 8*b* follows FIG. 8, and illustrates a work flow chart of the rescue device;

FIG. 8*c* follows FIG. 8, and illustrates a work flow chart in the automatic closing setting mode, FIG. 9 is a schematic view showing a system reset of the barrier operator unit of FIG. 3; and FIG. 9*a* is a partial enlarged view taken along line 9*a*-9*a* of FIG. 9.

DESCRIPTION OF THE PREFERRED EMBODIMENTS

Figure 1:
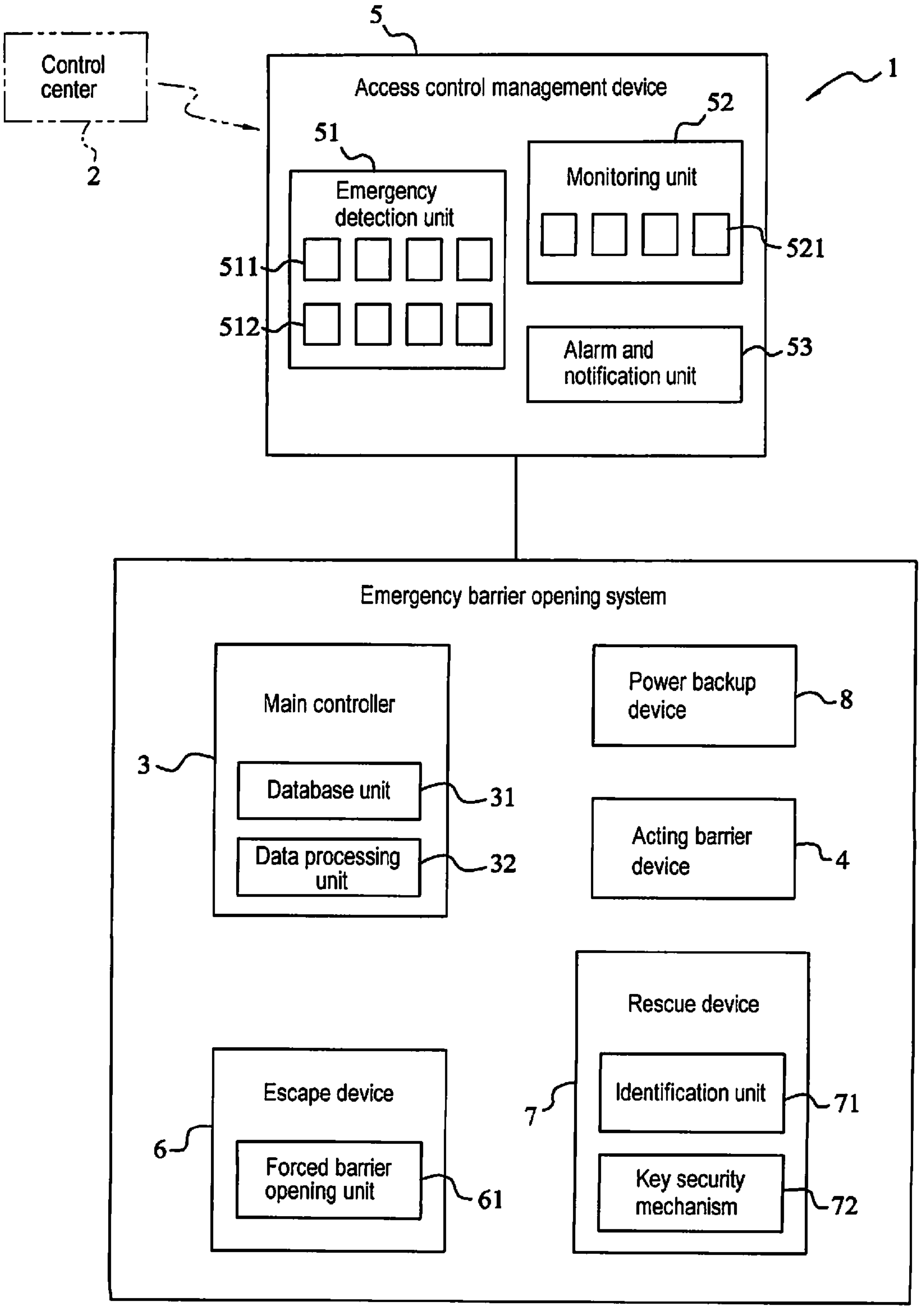
FIG. 1 is a system framework diagram showing a barrier opening system for emergency escape and rescue according to a preferred embodiment of the present invention.
Figure 2:
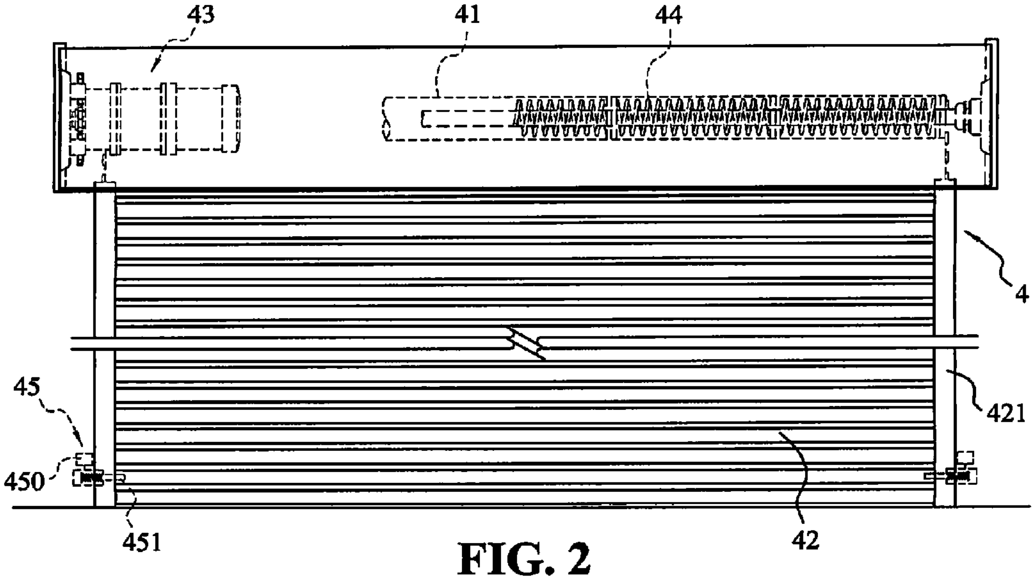
FIG. 2 is a schematic view showing a vertical acting barrier device of the present invention, wherein a portion of the vertical acting barrier device is cut off and a portion of the vertical acting barrier device is omitted.
Figure 3A:
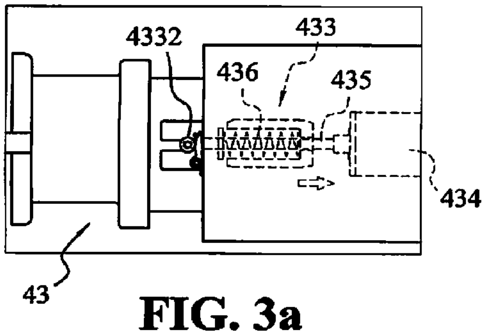

FIG. 1 schematically illustrates a system framework of a barrier opening system for emergency escape and rescue according to a preferred embodiment of the present invention. FIGS. 2, 3, and 3*a* illustrate examples of a vertical acting barrier device and barrier operator unit used in the present invention. With reference to FIG. 1, an access control management system 1 is, for example, set up in the management program of a community LAN (local area network) at the user terminal or the management program of a relay node of a security system. The access control management system 1 monitors the access control, personnel activity, and the facility condition at the user terminal (or at the relay node) by means of an access control management device 5 at the terminal such as, an emergency detection unit 51 and monitoring unit 52 to detect any abnormal conditions, and sends a detection signal to a remote control center 2 in real time so as to conduct a complete surveillance.

The above-mentioned LAN system communicates data and signals via transmission media such as, wire or wireless transmission media. The access control management system 1 comprises a main controller 3 which can take appropriate measures in response to an abnormal signal in the area to ensure the safety of the users in terms of access control, personnel activity, and facility condition. The hardware equipment of the emergency barrier opening system of the present invention primarily comprises a vertical acting barrier device 4, an escape device 6, a rescue device 7, a backup power device 8, etc. The main controller 3 is electrically connected with the vertical acting barrier device 4, the access control management device 5, the escape device 6, the rescue device 7, and the backup power device 8 to form a surveillance network.

Referring to FIGS. 1, 2, 3, and 3*a*, the vertical acting barrier device 4 is located at the entrance of a building. It is a safety barrier which can be operated freely indoors (from the inside) and prevent trespassing from outside. The vertical acting barrier device 4 primarily comprises a winding shaft 41, a barrier 42, a barrier operator unit 43, and a prestressed spring 44. The winding shaft 41 is pivotally mounted at the top of the gateway. The barrier 42 which is composed of a plurality of serially connected subpanels can be raised or lowered vertically along the barrier rails 421. The barrier 42 is connected to the winding shaft 41 at one end. The winding shaft 41 winds up the barrier 42 to open or release the barrier 42 to close. The barrier operator unit 43 is controlled to drive the winding shaft 41 to rotate by electric power. The prestressed spring 44 comprises, for example, a plurality of coil springs preloaded on the winding shaft 43 so that the barrier 42 can store a restoring force when the winding shaft 41 is driven to release the barrier 42 to close.

The barrier operator unit 43 shown in FIGS. 3 and 3*a* is an illustrative example and is not intended to restrict the implementation range of the present invention. The barrier operator unit 43 comprises a central shaft 4311 that extends through a shaft hub 4312 connecting to a partition plate 43*a*. The first end of the central shaft 4311 is coupled with the rotary shaft of an electric motor 431 (not shown) and fixedly connected with a brake disc 4314. The second end of the central shaft 4311 is connected with an output shaft 4313 through a plurality of gear sets. The output shaft 4313 drives the winding shaft 41 to rotate by means of a chain (not shown).

The brake mechanism 432 comprises a sleeve 4321 mounted on the central shaft 4311 and is able to slide axially. An electromagnetic generator 4315 encloses the shaft hub 4312 and is fixedly connected to the partition plate 43*a*. At the first end of the sleeve 4321 is provided a clutch end disc 4316 having an end face facing the brake disc 4314. An elastic element 4317 is accommodated in between the shaft hub 4312 and the electromagnetic generator 4315, with one end of which abuts the partition plate 43*a*, and the another end urges against the another end face of the clutch end disc 4316. Under normal condition, when the electric motor 431 rotates, the electromagnetic generator 4315 is excited to attract the clutch end disc 4316, thereby releases the brake disc 4314. The brake mechanism is now under a brake releasing state. When the electric motor 431 stops rotating, the elastic element 4317 urges against the clutch end disc 4316 to brake the brake disc 4313. The brake mechanism is now under a braking state.

A brake release mechanism 433 is used to release the brake mechanism 432 under abnormal conditions. In particular, the second end of the sleeve 4321 is provided with a pair of limit rings 4322. The brake release mechanism 433 comprises an actuating plate 4331 having a plurality of zig-zagging convex sections at one end. The one end of the actuating plate 4331 extends through and protrudes beyond the sleeve 4321 in such a way that the zig-zagging convex sections are positioned between the pairs of limit rings 4322. A swing arm 4332 is connected to the other end of the actuating plate 4331 at one end. The other end of the swing arm 4332 extends beyond and protrudes outside the barrier operator unit 43, and can oscillate between a holding position and an offset position. Furthermore, an actuator 434 such as a conventional solenoid is disposed outside the barrier operator unit 43. The actuator 434 comprises a slide bar 435, with one end connected with the swing arm 4332 and other end connected with the actuator 434. The slide bar 435 is biased by a spring 436 to slidably move toward the swing arm 4332 consistently. When electrically excited, the actuator 434 is activated to retract the slide bar 435 so as to keep the swing arm 4332 in the holding position. In such manner, the slide bar 435 may store a spring potential energy.

Referring now to FIGS. 4 and 4*a*, in case of power failure, the actuator 434 deactivates, the spring potential energy of the slide bar 435 is released to actuate the swing arm to move to the offset position. Subsequently, the actuating plate 4331 actuates the sleeve 4321 to slide in the direction to which the swing arm 4332 oscillates, which renders the clutch end disc 4316 to disengage from the brake disc 4314 so as to release the brake. Besides, the barrier operator unit 43 further comprises a pull-chain disc mechanism 46 for manually opening or closing the barrier in case of power interruption.

In the emergency barrier opening system of the present invention, the restoring force of the prestressed spring 44 is set to be greater than the weight of the barrier 42. Preferably, the restoring force of the prestressed spring is set to be capable of raising the barrier 42 up by at least about 70 inches (177.8 cm). More preferably, it is provided a barrier bolt unit 45 which may lock the barrier 42 at a predetermined position by means of a bolt pin 451 after the barrier is closed.

The barrier bolt unit 45 is an electronic lock controlled by a circuit, and comprises a linear actuator 450, for example, a solenoid. The linear actuator 450 can be activated to keep the bolt pin 451 in a lock state. At this time, a spring potential energy is accumulated in the bolt pin 451 and can lock the barrier 42 at a predetermined position by means of mechanical force. When the linear actuator 450 is not actuated, the bolt pin 451 is displaced to release the barrier 42. It is to be understood that the linear actuator is not limited to the solenoid, and the bolt pin can be actuated or operated in a number of ways.

The access control management device 5 comprises at least an emergency detection unit 51 and at least one monitoring unit 52 for detecting abnormal conditions in the compound under surveillance. The emergency detection unit 51, for example, comprises a plurality of temperature sensors 511 disposed at numerous predetermined indoor locations for detecting the temperatures of surrounding environment around the predetermined locations. The emergency detection unit 51 further comprises a plurality of smoke sensors 512 disposed at numerous predetermined locations for detecting the smoke concentrations of the surrounding environment around the predetermined locations. The emergency detection unit 51 further comprises a plurality of seismic sensors 513 disposed at numerous predetermined locations for detecting the seismic waves in temblor-prone areas. The monitoring unit 52, for example, comprises a plurality of surveillance cameras 521 disposed at numerous predetermined indoor locations for capturing video signals at the predetermined locations. It is to be noted that the access control management device 5 is not limited to the above-mentioned temperature sensors, smoke sensors, and surveillance cameras and other sensors such as, temperature sensitive fusible metal devices can be applied.

Referring to FIG. 5, the escape device 6 comprises a barrier opening unit 61 which is disposed inside the emergency exit at a location nearby the barrier 42. The barrier opening unit 61 comprises an emergency button 611 which is designed to be easily accessible and operable by intuition. For example, the emergency button 611 can be a conventional button which, upon simple pressing of the button, can interrupt the exciting circuit of the linear actuator 450 to actuate the bolt pin 451 in order to release the barrier 42. To avoid actuation of the emergency button by mistake, the emergency button 611 is preferably covered with a protective cover which can be uncovered for pressing the button in case of emergency. It is to be noted that the linear actuator and the emergency button are not limited to be electrically driven and other mode of operation such as, driven mechanically can also be used. In case of emergency, such mechanical locking mechanism can be operated manually to release the barrier.

Referring to FIGS. 6, 7, 7*a*, and 7*b*, the rescue device 7 comprises an identification unit 71 and a key security mechanism 72, and is provided, for example, outside the emergency exit, that is externally of the barrier 42. The identification unit 71 accepts identification data input by a user, while the key security mechanism 72 receives a master key for opening the barrier therein. In particular, the identification unit 71 can be, for example, a card reading device, a keyboard, or an image capture device. The card reading device can be a device used to read an identification chip (for example, RFID). The keyboard can be used to input a password and/or a user ID by the user. The image capture device can be used to obtain the biological features of the user, for example, the fingerprints or facial images. The key security mechanism 72 comprises a key box 721, a master key 722, and a switch 723. The key box 721 has a high security box structure for storing the master key 722 and the plan layout of the building. The switch 723 comprises a keyhole 724 corresponding to the master key 722, and is electrically connected with the barrier bolt unit 45, which enables the direct unlocking of the barrier bolt unit 45.

Preferably, the rescue device 7 is controlled by the main controller 3 and the security system control center 2. The key security mechanism can be opened only after the identification unit 71 confirms the identity of the user. Besides, the main controller 3 and the security system control center 2 are responsible for auditing the key security mechanism 72, and can track date, time, the user ID, etc. Preferably, the key box 721 is recessed in a wall near the entrance of the building, or is disposed within the surveillance range of a property management unit. Preferably, the identification unit 71 is disposed beside the key box 721 or at other suitable locations, and the switch 723 is disposed outside the entrance of the building.

The main controller 3 comprises at least a database unit 31 and a data processing unit 32. The database unit 31 stores temperature security data, smoke concentration security data, seismic wave security data, background image data, identification data, etc. The identification data comprises, for example, authorization codes, user IDs and associated passwords, and user image data. The authorization code is an identification code on an identification chip that can be read by the card reading device. The user image data is the fingerprint or facial image of the authorized user. The data processing unit 32 determines whether there exists an abnormal condition or not by comparing the temperatures of the surrounding environment detected by the temperature sensors 511, the smoke concentrations of the surrounding environment detected by the smoke sensors 512, and the surrounding images captured by the surveillance cameras 521 with the temperature security data, the smoke concentration security data, the seismic wave security data, and the background image data stored in the database unit 31.

The backup power device 8 can be, for example, a storage battery or a generator. The backup power device 8 is preferably disposed at a safe location outside the security area range, for example, in a public elevator hoistway or a public pipeline. In general, the backup power device 8 is used to store the electric power, and supplies a backup power to the system in case of power failure.

When at least one of the emergency detection unit 51 or the monitoring unit 52 shows an abnormal signal, the data processing unit 32 determines whether there is a disaster or accident occurs in the area under surveillance based on the difference in data between the abnormal signal and the security data of the database unit 31. Preferably, the access control management system 1 further comprises an alarm and notification unit 53 which may release a real-time alarm in sound and light form to show the escape route in case a disaster or accident indeed occurs.

After the main controller 3 further identifies the type of disaster, the disaster site, and the affected areas based on the analysis result presented by the data processing unit 31, the brake release mechanism 433 is activated to actuate the brake mechanism 432 to release the brake, so that the escape device 6 can be operated freely from the inside of the emergency exit. The main controller 3 assures that the brake mechanism 432 of the barrier operator unit 43 is in a brake release state before actuating the barrier opening unit 61. If the brake is not released, the main controller 3 will disconnect the circuit of the actuator 434 of the brake release mechanism 433 immediately to release the brake. At this time, the barrier bolt unit 45 which is still locked can be actuated by the emergency button 611 to release the bolt pin 451.

Meanwhile, the data processing unit 32 acquires the authorization code, ID and associated password, or the image data of the user through the identification unit 71, and compares the acquired data with the identification data of the database unit 31. The user will be authorized to open the key box 721 of the key security mechanism 72 once the user is confirmed to be a police officer or firefighter or authorized personnel. Then, the user can get access to the master key 722 and insert the same into the keyhole 724 of the switch 723 to activate the bolt pin 451 so as to release the barrier 42. When the master key 722 or the emergency button 611 actuates the bolt pin 451 to release the barrier 42, the barrier 42 can be lifted up by the restoring force of the prestressed spring 44.

FIGS. 8, 8*a*, and 8*b* are flow charts of the embodiment of the above-mentioned emergency barrier opening system. For details of the steps illustrated in the figures, reference is made to FIGS. 1, 2, 3~3*a*, 4~4*a*, 5, 6, 7, and 7*a*~7*b*.

Step S101: Activate the access control management system 1.

Step S101': Conduct full range surveillance through the remote control center 2.

Step S102: Activate the system to detect if a normal electric power supply is in effect.

Step S103: Initiate the operation of the access control management device 5 under the condition that a normal electric power is supplied.

Step S103*a*: The system determines if the emergency responder is activated. That is, if one of the escape device 6 or rescue device 7 is in operation, or the barrier device 4 is under maintenance. In the affirmative, activate the responder.

Step S103*b*: Under any one of the three forgoing conditions, the barrier panel is opened abnormally.

Step S104: After the three conditions have been ruled out, the system detects, the system detects whether or not the emergency detection unit 51 and the monitoring unit 52 are functioning normally. If yes, the emergency detection unit 51 and the monitoring unit 52 uploads the detection signals in real-time.

Step S105: The system detects if the automatic closing setting mode is ON or not.

Step S105*a*: Under the automatic closing setting mode, after the barrier panel 42 has been opened, the automatic closing of the barrier panel will be delayed for a predetermined setting time.

Step S105-1: Under the manual operation setting mode, the barrier panel 42 can be raised by actuating the barrier opening button of the acting barrier device 4, dropped by actuating the barrier closing button, or stopped by actuating the stop button of the acting barrier device 4.

If the emergency detection unit 51 and the monitoring unit 52 are detected to function abnormally in Step S104, proceed to Step S106 below.

Step S106: The main controller 3 of the system makes use of the data processing unit 32 to detect whether or not the temperature sensors 511, the smoke sensors 512, and seismic sensors 513 of the emergency detection unit 51 transmit the temperatures, smoke concentrations, and seismic wave data of the surrounding environment and detects whether or not the surveillance cameras 521 of the monitoring unit 52 transmit the image signals, so as to determine whether the sensors and cameras operate normally or not. If the detection signals are normal, return to Step S103 for next proceeding.

Step S107: When the detection signals are abnormal, the main controller 3 of the system further compares the detected results obtained by the data processing unit 32 with the temperature security data, the smoke concentration security data, the seismic wave data and the background image data stored in the database unit 31, and determines whether there exists a disaster in the area under surveillance or not. If the comparison result further confirms that a disaster does not occur, return to Step 103 for next proceeding.

Step S108: When the main controller 3 of the system confirms the occurrence of a disaster, the type of disaster, the disaster site, and the affected areas are identified based on the analysis result and the alarm and notification unit 53 releases a real-time alarm in sound and light form to show an escape route.

Step S109: Under a normal power supply, the switch can be operated to open the barrier for escape.

If in Step S102, the system detects a power failure, proceed to Step S110 below.

Step S110: Main controller 3 activates the backup power device 8 to supply electric power.

Step S111: The system detects whether the backup power device 8 is functioning normally or not.

Step S112: If the backup power device 8 fails to supply power, the actuator 434 of the brake release mechanism 433 of the barrier operator unit 43 will release the brake (as shown in FIGS. 4 and 4*a*); meanwhile, the linear actuator 450 of the barrier bolt unit 45 which is not electrically excited, releases the bolt pin 451 so as to release the barrier 42; at this time, the barrier 42 is raised by the action of the prestressed spring 44 to open.

Step S113: Under the condition that the backup power device 8 is normal in supplying power, the main controller 3 of the system further compares the temperatures, the smoke concentrations, and the seismic vibration of the surrounding environment provided by the temperature sensors 511, the smoke sensors 512 and seismic sensors 513 of the emergency detection unit 51 and the surrounding image signals provided by the surveillance cameras 521 of the monitoring unit 52 with the temperature security data, the smoke concentration security data, and the background image data stored in the database unit 31 by means of the data processing unit 32, so as to determine whether a disaster occurs in the area under surveillance or not. If the analysis result confirms that a disaster does not occur, Step S113 is repeated to conduct continuous monitoring.

Step S114: When the main controller 3 of the system confirms the occurrence of a disaster, the type of the disaster, the disaster site, and the affected areas are identified based on the analysis result, and the severity of the disaster is analyzed so as to determine if an emergency rescue is needed.

Step S115: If the main controller 3 of the system determines that it is a minor disaster and no rescue is needed, the barrier 42 is held at the original position and Step S113 is repeated to conduct continuous monitoring.

Step S116: When the main controller 3 of the system determines that it is a major disaster and a rescue is urgently needed, the alarm and notification unit 53 releases a real-time alarm in sound and light form to show the escape route.

Step S117: At the same time, the emergency barrier opening system starts to operate.

FIG. 8*a* shows an emergency barrier opening system that is designed to give priority to escaping.

Step S118: The escape device 6 operates to help those trapped indoors to open the barrier in the shortest possible time for safe evacuation.

Step S119: The main controller 3 of the system assures that the brake mechanism 432 of the barrier operator unit 43 is already in a brake release state before actuates the barrier opening unit 61. If the brake mechanism is not in a brake release state, the main controller 3 disconnects the circuit of the actuator 434 of the brake release mechanism 433 for releasing the brake. However, at this time, the barrier bolt unit 45 is still locked.

Step S120: Those trapped indoors can operate the emergency button 611 freely from the inside of the emergency exit to actuate the bolt pin 451 of the barrier bolt unit 45 to be in a barrier open state.

Step S121: When the bolt pin 451 of the barrier bolt unit 45 releases the barrier 42, the prestressed spring 44 releases the prestress to actuate the winding shaft 41.

Step S122: The winding shaft 41 winds up the barrier 42 to raise it to open.

FIG. 8*b* shows an emergency barrier opening system that is designed to give priority to rescuing.

Step S123: The rescue device 7 operates to help the police officers/firefighters to enter the building in the shortest possible time for rescue without having to break the barrier.

Step S124: the main controller 3 of the system makes use of the data processing unit 32 to acquire the authorization code, ID and associated password, or image data of the user provided by the identification unit 71 (for example, a card reading device, keyboard, or image capture device)(as shown in FIG. 7), and compares the acquired data with the identification data of the database unit 31 so as to confirm whether the user is a rescue personnel or not. If the main controller 3 confirms that the user is not a rescue personnel, back to Step S123 for next operation.

Step S125: If the main controller 3 confirms that the user is a rescue personnel, the user will be authorized to open the key box 721 of the key security mechanism 72 and get access to the master key 722 from the key box 721 (as shown in FIG. 7*a*).

Step S126: The rescue personnel can insert the master key 722 into the keyhole 724 from the outside of the emergency exit to actuate the bolt pin 451 of the barrier bolt unit 45.

Step S127: When the bolt pin 451 of the barrier bolt unit 45 releases the barrier 42, the prestressed spring 44 releases the prestress to actuate the winding shaft 41 to rotate.

Step S128: The winding shaft 41 winds up the barrier 42 to raise it to open.

As shown in FIG. 8C, the user may optionally select the automatic closing setting mode or manual operation setting mode by means of the access control management device 5 of the present invention. Under the condition that the automatic closing setting mode is in operation, in step 105*a*, after the barrier is opened urgently by the actuation of either the escape device 6 or the rescue device 7, the automatic closing setting mode will take effect after the escape or rescue conditions have been ruled out or after the system restores to its normal condition.

Step S105*b*: The system detects if the feedback signals from, for example, the monitor type safety device located at the bottom of the barrier 42 is normal or not. If the feedback signals are abnormal, return to step S105*a* for next proceeding.

Step S105*c*: If the feedback signals of the monitor type safety device are normal, a delayed time is set by a timer to be, for example, 10 seconds (may be changed as desired), and voice warning is issued before closing the barrier automatically.

Step S105*d*: The system controls the barrier operator unit 43 to actuate the winding shaft 41 so as to wind up the barrier 42 for raising the barrier to open.

Given the above description regarding the preferred embodiment of the emergency barrier opening system, once a disaster, for example, a fire, an earthquake, or a flood, occurs, the system can still in function due to the backup power even if the power supply is interrupted. Whenever necessary, after the main controller confirms that at least one of the users is a rescue personnel, the user will be authorized to use the master key to activate the bolt pin so as to release the barrier to open. As a result, the rescue personnel can enter the building in the shortest possible time for rescue without having to break through the barrier and causing a damage of property. Additionally, in case of emergency, those trapped indoors can still open the barrier for safe evacuation in the shortest possible time by pressing the emergency button even without electricity and external assistances. Besides, the above emergency barrier opening system is so designed that, even if the backup power is cut off, the bolt pin of the barrier bolt unit can automatically release the barrier so as to lift up the barrier.

FIGS. 9 and 9*a* illustrate the resetting of the system for the barrier operator unit 43 of the present invention after the above-mentioned emergency situation has been eliminated and the power supply restored. As shown in the Figures, under electric excitation, the actuator 434 of the brake release mechanism 433 retracts the slide bar 435. The barrier operator 43 further comprises a lever 47 located opposite to the brake release mechanism 433. The lever 47 is pivoted at its center, so it can swing to the right and left. One end of the lever 47 abuts one side of the swing arm 4332 in a direction opposite to the slide bar 435, and the other end of the lever 47 is connected with a hoist rope 48. Another end of the hoist rope 45 is guided to the front end of the barrier operator unit 43 and extends downward. When the hoist rope 48 is pulled at its free end, the lever 47 can restore the swing arm 4332 to its holding position, such that the brake mechanism 432 of the barrier operator unit 43 resumes its operation (as shown in FIG. 3).

While the preferred embodiments have been described as above, it is to be noted that the description and accompanying drawings disclosed herein are not intend to restrict the scope of implementation of the present invention. Variations and modifications equivalent to the above embodiments and able to be realized are considered to be within the scope of the present invention.

What is claimed is:

1. A barrier opening system for emergency escape and rescue, comprising:

a vertical acting barrier device having a winding shaft for winding a barrier to open or unwinding the barrier to close;

a prestressed spring preloaded on the winding shaft for providing a restoring force to the barrier when the winding shaft unwinds the barrier;

a barrier operator unit comprising:

a central shaft, an electric motor coupled with the central shaft for rotating the winding shaft, one end of the central shaft is fixedly connected with a brake disc;

a brake mechanism comprising: a sleeve mounted on the central shaft so as to be axially slidable thereon; a clutch end disc arranged to face the brake disc and attach to one end of the sleeve, a pair of limit rings being arranged on the other end of the sleeve; an elastic element adapted to urge the clutch end disc to urge against the brake disc so as to brake the central shaft; an electromagnetic generator adapted to retract the clutch end disc to separate the clutch end disc from the brake disc so as to release the central shaft; and a brake release mechanism comprising: a swing arm having a first end arranged between the pair of limit rings, and a second end extending through the barrier operator unit, the swing arm is configured to oscillate between a holding position and an offset position at which the sleeve is actuated to slide axially to thereby separate the clutch end disc from the brake disc; an actuator disposed externally of the barrier operator unit; and a slide bar slidably mounted between the swing arm and the actuator, and is biased by a spring to slidably moved toward the swing arm consistently; wherein the actuator is activated to retract the slide bar when electrically excited, whereby the slide bar stores a spring potential energy therein, and in case of power failure, the actuator releases the slide bar to swing the swing bar toward the offset position, to thereby release the brake so that the winding shaft is rotatable freely;

an escape device having a barrier opening unit for activating the brake release mechanism to release the brake mechanism through an emergency button;

a rescue device having at least a key security mechanism for storing a master key therein, the master key is adapted to activate the brake release mechanism to release the brake mechanism;

a backup power device for supplying a backup power in case of a power failure;

a main controller electrically connected with the barrier operator unit, the escape device, the rescue device, and the backup power device; when the main controller activates the electric motor to rotate, the brake mechanism effects a brake release action, and when the controller deactivates the electric motor to cease to rotate, the brake mechanism effects a braking action; and the main controller is adapted to control the key security mechanism to release the master key as needed; wherein the barrier is raised by the restoring force of the prestressed spring when at least one of the emergency button or the master key activates the brake release mechanism to release the brake mechanism.

2. The barrier opening system for emergency escape and rescue as claimed in claim 1, wherein the restoring force of the prestressed spring is greater than the weight of the barrier, and the restoring force of the prestressed spring is set to be capable of raising the barrier for at least 80 inches or 203.2 cm.

3. The barrier opening system for emergency escape and rescue as claimed in claim 1, wherein the actuator of the brake release mechanism is a solenoid adapted to hold the slide bar in a retracted position when electrically excited and to release the slide bar when not electrically excited.

4. The barrier opening system for emergency escape and rescue as claimed in claim 1, wherein the rescue device further comprises an identification unit for accepting an identification data input by a rescue personnel; and the main controller comprises a database unit for storing identification data, and a data processing unit for comparing the identification data input by the rescue personnel to the identification unit with the identification data stored in the database unit, and activating the key security mechanism to allow the rescue personnel to gain access to the master key when there is a match in the identification data compared.

5. The barrier opening system for emergency escape and rescue as claimed in claim 1, further comprising an access control management device electrically connected with the main controller, the access control management device comprises an emergency detection unit having temperature sensors for detecting the temperatures of the environment, smoke sensors for detecting smoke concentrations of the environment, and seismic sensors for detecting seismic waves; and a monitoring unit having a surveillance camera for capturing images of the environment; the database unit is adapted to store temperature security data, smoke concentration security data, and background image data, wherein the data processing unit compares the temperatures of the environment detected by the temperature sensors, the smoke concentrations of the environment detected by the smoke sensors, the seismic waves of the environment captured by the seismic sensors, and the images of the environment captured by the surveillance camera with the temperature security data, the smoke concentration security data, the seismic wave security data and the background image data stored in the database unit, and after the main controller identifies the type of disaster, the disaster site, and the affected areas based on the comparison result of the data processing unit, the main controller controls the brake release mechanism to release the brake mechanism.

6. The barrier opening system for emergency escape and rescue as claimed in claim 1, wherein the vertical acting barrier device further comprises a barrier bolt device having a linear actuator and a bolt pin, the linear actuator actuates the bolt pin to lock the barrier in a barrier closed position; the linear actuator is operable by at least one of the emergency button or the master key to release the bolt pin.

7. The barrier opening system for emergency escape and rescue as claimed in claim 6, wherein the linear actuator is a solenoid adapted to hold the bolt pin in a lock state when electrically excited and to release the bolt pin when not electrically excited.

8. The barrier opening system for emergency escape and rescue as claimed in claim 1, wherein the key security mechanism comprises a key box for storing the master key and a switch corresponding to the master key, the switch is adapted to activate the linear actuator by means of the master key to release the bolt pin.

9. The barrier opening system for emergency escape and rescue as claimed in claim 1, wherein the identification unit comprises at lease one of a card reading device, a keyboard, and an image capture device.

10. The barrier opening system for emergency escape and rescue as claimed in claim 9, wherein the identification data comprise at least one of an authorization code, a user ID and password, or a user image.

11. The barrier opening system for emergency escape and rescue as claimed in claim 1, wherein the access control management device further comprises an alarm and notification unit adapted to release a real-time alarm in sound and light form, and to show an escape route by audio or light.

* * * * *